(12) United States Patent
Hagiyama et al.

(10) Patent No.: US 9,847,516 B2
(45) Date of Patent: Dec. 19, 2017

(54) NON-AQUEOUS ELECTROLYTE SECONDARY BATTERY

(71) Applicants: NISSAN MOTOR CO., LTD., Yokohama-shi, Kanagawa (JP); AUTOMOTIVE ENERGY SUPPLY CORPORATION, Zama-shi, Kanagawa (JP)

(72) Inventors: Kosuke Hagiyama, Yokohama (JP); Takashi Honda, Yokohama (JP); Ryuta Yamaguchi, Yokohama (JP); Ikuma Matsuzaki, Yokohama (JP); Takeshi Miyamoto, Yokohama (JP); Osamu Shimamura, Zama (JP); Keisuke Matsumoto, Zama (JP)

(73) Assignees: Nissan Motor Co., Ltd., Yokohama-shi, Kanagawa (JP); Automotive Energy Supply Corporation, Zama-shi, Kanagawa (JP)

( * ) Notice: Subject to any disclaimer, the term of this patent is extended or adjusted under 35 U.S.C. 154(b) by 77 days.

(21) Appl. No.: 14/780,460

(22) PCT Filed: Mar. 26, 2014

(86) PCT No.: PCT/JP2014/058681
§ 371 (c)(1),
(2) Date: Sep. 25, 2015

(87) PCT Pub. No.: WO2014/157414
PCT Pub. Date: Oct. 2, 2014

(65) Prior Publication Data
US 2016/0056419 A1    Feb. 25, 2016

(30) Foreign Application Priority Data
Mar. 26, 2013  (JP) .................. 2013-064911

(51) Int. Cl.
*H01M 4/02* (2006.01)
*H01M 4/36* (2006.01)
(Continued)

(52) U.S. Cl.
CPC ......... *H01M 2/024* (2013.01); *H01M 2/0262* (2013.01); *H01M 2/08* (2013.01);
(Continued)

(58) Field of Classification Search
CPC ...... H01M 6/12; H01M 6/46; H01M 10/0585; H01M 6/22; H01M 6/181; H01M 4/13
See application file for complete search history.

(56) References Cited

U.S. PATENT DOCUMENTS 6,399,246 B1 * 6/2002 Vandayburg ........ H01M 4/0402
                                                           429/217
2003/0054244 A1  3/2003 Fredriksson et al.
(Continued)

FOREIGN PATENT DOCUMENTS

CN          1430304 A       7/2003
CN       101443948 A       5/2009
(Continued)

*Primary Examiner* — Ula C Ruddock
*Assistant Examiner* — Julian Anthony
(74) *Attorney, Agent, or Firm* — Young Basile Hanlon & MacFarlane, P.C.

(57) ABSTRACT

A non-aqueous electrolyte secondary battery allows gas generated when an aqueous binder is used as a binder of a negative electrode active material to be effectively discharged from the electrode, and has small decrease of the battery capacity despite use over a long period of time. The non-aqueous electrolyte secondary battery has a positive electrode active material layer, a negative electrode active material layer, and a separator. The density of the negative electrode active material layer is 1.4 to 1.6 g/cm³, an electrolyte solution layer is disposed between at least one
(Continued)

layer of the negative electrode active material layer and the positive electrode active material layer, and the separator, and the ratio of total thickness of the positive electrode, the negative electrode and the separator to total thickness of the positive electrode, the negative electrode, the separator and the electrolyte solution layer, is 0.85 or more and less than 1.0.

12 Claims, 3 Drawing Sheets

(51) Int. Cl.

| | | |
|---|---|---|
| H01M 2/16 | (2006.01) | |
| H01M 2/18 | (2006.01) | |
| H01M 6/12 | (2006.01) | |
| H01M 6/46 | (2006.01) | |
| H01M 2/02 | (2006.01) | |
| H01M 4/13 | (2010.01) | |
| H01M 10/05 | (2010.01) | |
| H01M 10/0585 | (2010.01) | |
| H01M 4/62 | (2006.01) | |
| H01M 10/04 | (2006.01) | |
| H01M 2/08 | (2006.01) | |
| H01M 10/0525 | (2010.01) | |
| H01M 10/42 | (2006.01) | |

(52) U.S. Cl.
CPC .............. *H01M 4/13* (2013.01); *H01M 4/621* (2013.01); *H01M 4/622* (2013.01); *H01M 10/0468* (2013.01); *H01M 10/05* (2013.01); *H01M 10/0525* (2013.01); *H01M 10/0585* (2013.01); *H01M 2004/021* (2013.01); *H01M 2010/4292* (2013.01); *H01M 2220/20* (2013.01)

(56) References Cited

U.S. PATENT DOCUMENTS

| | | |
|---|---|---|
| 2003/0124416 A1 | 7/2003 | Kaneta |
| 2007/0009794 A1* | 1/2007 | Takami .................. H01M 2/021 429/184 |
| 2009/0136848 A1 | 5/2009 | Minami et al. |
| 2010/0261068 A1 | 10/2010 | Jeon et al. |
| 2013/0047430 A1 | 2/2013 | Hiramatsu et al. |

FOREIGN PATENT DOCUMENTS

| | | |
|---|---|---|
| JP | H11111339 A | 4/1999 |
| JP | 2002110252 A | 4/2002 |
| JP | 2005005113 A | 1/2005 |
| JP | 2005-228642 A | 8/2005 |
| JP | 2005-268029 A | 9/2005 |
| JP | 2005259635 A | 9/2005 |
| JP | 3998736 B2 | 10/2007 |
| JP | 2008293715 A | 12/2008 |
| JP | 2010-080297 A | 4/2010 |
| JP | 2010530118 A | 9/2010 |
| JP | 2011-054408 A | 3/2011 |
| JP | 2012089444 A | 5/2012 |
| JP | 2012-181978 A | 9/2012 |
| JP | 2013045598 A | 3/2013 |

\* cited by examiner

US 9,847,516 B2

NON-AQUEOUS ELECTROLYTE SECONDARY BATTERY

CROSS REFERENCE TO RELATED APPLICATION

The present application claims priority to Japanese Patent Application No. 2013-064911, filed Mar. 26, 2013, incorporated herein in its entirety.

TECHNICAL FIELD

The present invention relates to a non-aqueous electrolyte secondary battery.

BACKGROUND

In recent years, developments of electric vehicles (EV), hybrid electric vehicles (HEV) and fuel cell vehicles (FCV) have been advanced against the background of escalating environmental protection movement. For a power source for driving motors used on those vehicles, a rechargeable secondary battery is suitable. In particular, what is attracting the attention is a non-aqueous electrolyte secondary battery such as a lithium-ion secondary battery expected to provide high capacity and high output.

A non-aqueous electrolyte secondary battery is provided to have a positive electrode active material layer that is formed on a surface of a current collector and includes a positive electrode active material (for example, $LiCoO_2$, $LiMO_2$, or $LiNiO_2$). Additionally, the non-aqueous electrolyte secondary battery is provided to have a negative electrode active material layer that is formed on a surface of a current collector and includes a negative electrode active material (for example, metal lithium, carbonaceous materials such as cokes, natural and synthetic graphite, metal materials including Sn and Si and oxides of them).

A binder for binding an active material which is used for an active material layer is classified into an organic solvent-based binder (binder which is not dissolved/dispersed in water but dissolved/dispersed in an organic solvent) and an aqueous binder (a binder which is dissolved/dispersed in water). The organic solvent-based binder can be industrially disadvantageous due to high cost such as raw material cost for an organic solvent, recovery cost, and cost relating to waste processing. Meanwhile, the aqueous binder has an advantage of lowering a burden on environment and greatly suppressing an investment on facilities of a production line, since water as a raw material is conveniently available and only water vapor is generated during drying. The aqueous binder also has an advantage that, since the aqueous binder has a high binding effect even with a small amount compared to an organic solvent-based binder, it can increase a ratio of an active material per same volume so that a electrode with high capacity can be achieved.

From the viewpoint of having those advantages, various attempts have been made for forming a negative electrode by using an aqueous binder as a binder for forming an active material layer. For example, in JP 2010-80297 A, a negative electrode for a non-aqueous electrolyte secondary battery is proposed in which the negative electrode active material layer contains a polyvinyl alcohol and carboxymethylcellulose together with a latex-based binder such as styrene butadiene rubber (SBR) of an aqueous binder.

However, it was found out that in a non-aqueous electrolyte secondary battery containing a negative electrode active material layer using an aqueous binder, the amount of gas generated from the electrode during first time charge and discharge increases than that using an organic binder. If the amount of the generated gas increases, there is a concern that it has influence on the battery properties, and particularly the battery capacity may decrease when the battery is used over a long period of time.

SUMMARY

Accordingly, an object of the present invention is to provide a non-aqueous electrolyte secondary battery which can efficiently discharge the gas generated to the outside of the electrode and exhibits a low decrease in battery capacity even when used for a long period of time in the case of using an aqueous binder as the binder of the negative electrode active material layer.

The non-aqueous electrolyte secondary battery according to the present invention includes a positive electrode in which a positive electrode active material layer is formed on a surface of a positive electrode current collector, a negative electrode in which a negative electrode active material layer containing an aqueous binder is formed on a surface of a negative electrode current collector, and a separator that is disposed between the positive electrode active material layer and the negative electrode active material layer. In addition, the non-aqueous electrolyte secondary battery is characterized in that the density of the negative electrode active material layer is 1.4 to 1.6 $g/cm^3$, and the ratio of total thickness of the positive electrode, the negative electrode and the separator to total thickness of the positive electrode, the negative electrode, the separator and the electrolyte solution layer is 0.85 or more and less than 1.0.

DETAILED DESCRIPTION OF THE EMBODIMENTS

Figure 1:
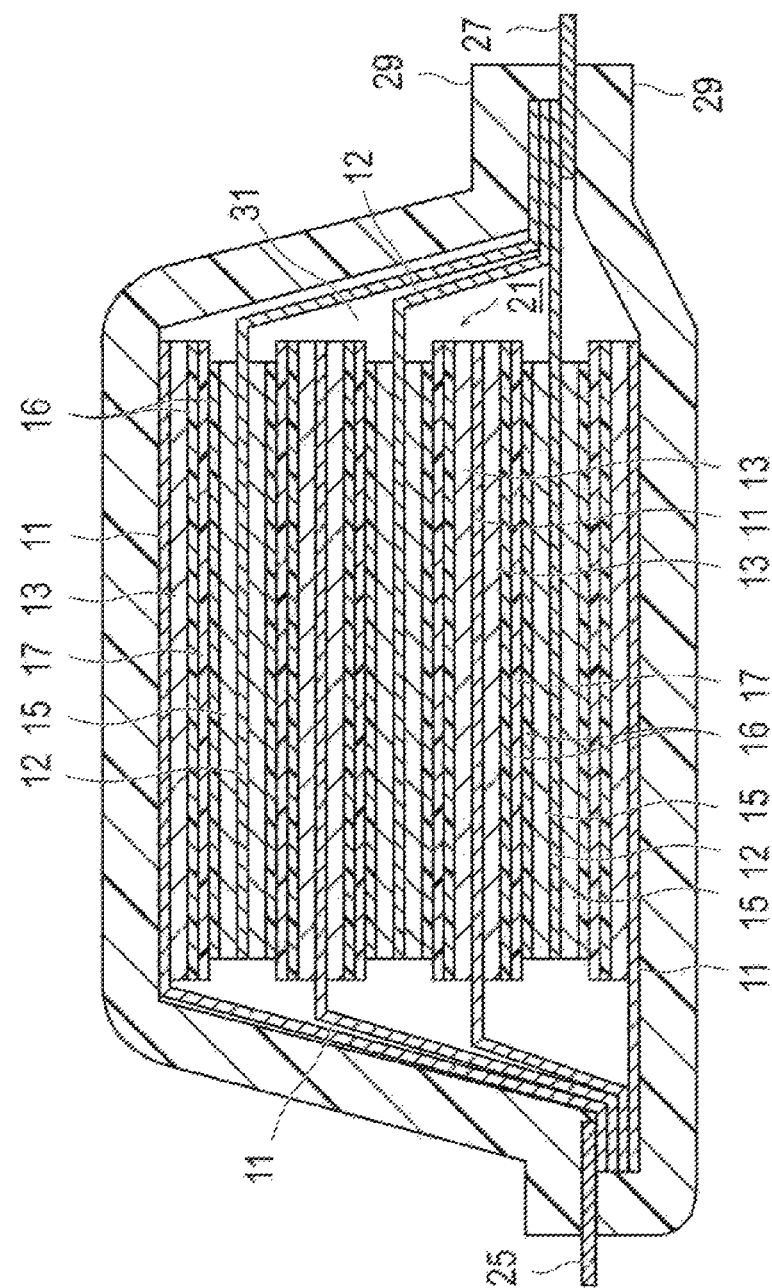
FIG. 1 is a cross-sectional view schematically illustrating the basic constitution of a non-aqueous electrolyte lithium ion secondary battery which is not a bipolar type of a flat type (stack type)

The invention is a non-aqueous electrolyte secondary battery which has a power generating element comprising a positive electrode in which a positive electrode active material layer is formed on a surface of a positive electrode current collector, a negative electrode in which a negative electrode active material layer containing an aqueous binder is formed on a surface of a negative electrode current collector, and a separator that is disposed between the positive electrode active material layer and the negative electrode active material layer, wherein the density of the negative electrode active material layer is 1.4 to 1.6 $g/cm^3$, an electrolyte solution layer is disposed between at least one layer of the negative electrode active material layer and the positive electrode active material layer, and the separator, and the ratio of total thickness of the positive electrode, the negative electrode and the separator to total thickness of the positive electrode, the negative electrode, the separator and the electrolyte solution layer is 0.85 or more and less than 1.0.

As described above, an aqueous binder has various advantages since water can be used as a solvent in production of an active material layer, and also has high binding property for binding an active material. However, the inventors found that when an aqueous binder is used in a negative electrode active material layer, there is a problem that the amount of gas generated during first time charge and discharge is large in comparison to a negative electrode using an organic solvent-based binder. It is believed that this is because water, which is a solvent used in dissolving (dispersing) the aqueous binder, remains in the electrode, and this water is decomposed and becomes gas, and thus generation of gas increases more than an organic solvent-based binder. Due to such gas generation, when an aqueous binder is used in a negative electrode active material layer, the discharge capacity of a battery decreases when the battery is used over a long period of time in comparison to initial discharge capacity of the battery. It is believed that this is because gas remains on the active material layer by generation of gas, and formation of an SEI film on the surface of the negative electrode becomes uneven.

In a stack type laminate battery of which the capacity per single cell is several to several tens of times larger than that of consumer use, the electrode is large-sized for improvement of the energy density, and thus the amount of generated gas further increases, and uneven reaction on the negative electrode further easily occurs as well.

As results of earnest investigation based on the findings described above, the inventors had an idea that if a gas path is made in the negative electrode active material layer, and a mechanism is manufactured in which gas having escaped the active material layer is discharged from a power generating element, it may be possible to effectively discharge the generated gas from the system, and based on this idea, the inventors completed the constitution of the invention. In the invention, the density of the negative electrode active material layer, and the thickness of the electrolyte solution layer (located between the negative electrode (positive electrode) active material layer/the separator) are within specific ranges. It is believed that by moderately controlling the density of the negative electrode active material layer, a path of generated gas is formed, and further by the presence of the electrolyte solution layer, gas having escaped the gas path in the power generating element is discharged from the electrolyte solution layer to the outside of the system of the power generating element. If the electrolyte solution layer is not present, gas is discharged from the separator and the active material layer. However, the separator and the active material layer are resin layers. It is believed that since gas discharge from liquid is faster than gas discharge from such resin layer, outgassing is effectively performed according to the constitution of the invention in comparison to a conventional battery. Specifically, according to the constitution of the invention, gas paths are suitably manufactured in electrode-perpendicular direction and in electrode-plane direction, whereby to smoothly discharge generated gas from the system, and improve the battery performance.

Thus, according to the invention, generated gas becomes easily discharged from the electrode even when the aqueous binder is used as a binder of the negative electrode active material layer, which allows a non-aqueous electrolyte secondary battery to have small decrease of the battery capacity despite use over a long period of time.

Next, a description will be made of a non-aqueous electrolyte lithium ion secondary battery as a preferred embodiment of the non-aqueous electrolyte secondary battery, but it is not limited thereto.

Meanwhile, the same elements are given with the same symbols for the descriptions of the drawings, and overlapped descriptions are omitted. Further, note that dimensional ratios in the drawings are exaggerated for the sake of description, and are different from actual ratios in some cases.

FIG. 1 is a cross-sectional view schematically illustrating the basic constitution of a non-aqueous electrolyte lithium ion secondary battery which is a flat type (stack type) and not a bipolar type (hereinbelow, it is also simply referred to as a "stack type battery"). As illustrated in FIG. 1, the stack type battery 10 according to this embodiment has a structure in which a power generating element 21 with a substantially rectangular shape, in which a charge and discharge reaction actually occurs, is sealed inside of a battery outer casing 29. Herein, the power generating element 21 has a constitution in which a positive electrode, the separator 17, and a negative electrode are stacked in this order. In addition, the separator 17 has a non-aqueous electrolyte (for example, liquid electrolyte) therein. The positive electrode has a structure in which the positive electrode active material layer 13 is disposed on both surfaces of the positive electrode current collector 11. The negative electrode has a structure in which the negative electrode active material layer 15 is disposed on both surfaces of the negative electrode current collector 12. Specifically, one positive electrode active material layer 13 and the neighboring negative electrode active material layer 15 are disposed to face each other via the separator 17, and the negative electrode, the electrolyte layer, and the positive electrode are stacked in this order.

Meanwhile, on the outermost layer positive electrode current collector which is present on both outermost layers of the power generating element 21, the positive electrode active material layer 13 is disposed only on a single surface. However, an active material layer may be formed on both surfaces. Namely, not only a current collector exclusive for an outermost layer in which an active material layer is formed on a single surface can be achieved but also a current collector having an active material layer on both surfaces can be directly used as a current collector of an outermost layer. Furthermore, by reversing the arrangement of the positive electrode and negative electrode of FIG. 1, it is also possible that the outer most layer negative electrode current collector is disposed on both outermost layers of the power generating element 21 and a negative electrode active material layer is disposed on a single surface or both surfaces of the same outermost layer negative electrode current collector.

The positive electrode current collector 11 and negative electrode current collector 12 have a structure in which each of the positive electrode current collecting plate (tab) 25 and negative electrode current collecting plate (tab) 27, which conductively communicate with each electrode (positive electrode and negative electrode), is attached and inserted to the end part of the battery outer casing 29 so as to be led to the outside of the battery outer casing 29. If necessary, each of the positive electrode current collecting plate 25 and negative electrode current collecting plate 27 can be attached, via a positive electrode lead and negative electrode lead (not illustrated), to the positive electrode current collector 11 and negative electrode current collector 12 of each electrode by ultrasonic welding or resistance welding.

In FIG. 1, electrolyte solution layers 16 are present between the negative electrode active material layer 15 and the separator 17, and between the positive electrode active material layer 13 and the separator 17.

Meanwhile, although a stack type battery which is a flat type (stack type), not a bipolar type is illustrated in FIG. 1, it can be also a bipolar type battery containing a bipolar type electrode which has a positive electrode active material layer electrically bound to one surface of a current collector and a negative electrode active material layer electrically bound to the opposite surface of the current collector. In that case, one current collector plays both roles of a positive electrode current collector and a negative electrode current collector.

Hereinafter, the electrolyte solution layer and the negative electrode active material layer, which are characteristic parts of the invention, are described in more detail.

[Electrolyte Solution Layer]

In the invention, the ratio of total thickness of the positive electrode, the negative electrode and the separator to total thickness of the positive electrode, the negative electrode, the separator and the electrolyte solution layer is 0.85 or more and less than 1.0. Herein, the electrolyte solution layer may be present between either one of the active material layers in the power generating element and the separator. Considering the effects of the invention, the electrolyte solution layer is preferably present at least between the negative electrode active material layer and the separator. More preferably, the electrolyte solution layers are present between the positive electrode active material layer and the separator, and the negative electrode active material layer and the separator. If the ratio of total thickness of the positive electrode, the negative electrode and the separator to total thickness of the positive electrode, the negative electrode, the separator and the electrolyte solution layer is less than 0.85, the path of lithium ion becomes long, and ion migration in the battery is inhibited. Thus, the reaction in the electrode-side is uneven, and an area having high voltage in which the gas generation amount is large, is partially present in the electrode. In addition, if the ratio of total thickness of the positive electrode, the negative electrode and the separator is 1.0 or more, gas becomes discharged from compression of a resin layer such as the separator, and discharge of gas from the system is not smoothly performed. Therefore, if the total thickness of the positive electrode, the negative electrode and the separator to total thickness of the positive electrode, the negative electrode, the separator and the electrolyte solution layer is 1.0 or more, or less than 0.85, the long-term cycle property of the battery decreases. In addition, the ratio of total thickness of the positive electrode, the negative electrode and the separator to total thickness of the positive electrode, the negative electrode, the separator and the electrolyte solution layer is preferably 0.95 or more and less than 1.0 from the viewpoint that the effect of the invention, that is, gas discharge, is further exhibited.

Hereinafter, the total thickness of the positive electrode, the negative electrode, the separator and the electrolyte solution layer is also referred to as the thickness of the power generating constituent element. In addition, the total thickness of the positive electrode, the negative electrode and the separator is also referred to as the thickness of the power generating element members. Meanwhile, the thickness of the power generating element members is obtained by calculation from physical thicknesses of the positive electrode, the negative electrode and the separator. In addition, the thickness of the power generating constituent element may be obtained from measurement of the thickness of the battery sealed with a laminate film minus the thickness of the laminate film.

Meanwhile, the electrolyte solution layer indicates a layer consisting of liquid electrolytes in which lithium salts are dissolved in an organic solvent, and means that thickness consisting of the liquid electrolytes is present between the separator and the active material layer. In other words, "an electrolyte solution layer is disposed between the active material layer and the separator" refers to the state that the interval of the active material layer and the separator is filled with the electrolyte solution in constant thickness without physical contact of the active material layer and the separator. Thus, the electrolyte solution "layer" means not only a structure having physically closed ends, but also those having thickness consisting of liquid electrolytes between the separator and the active material layer.

The liquid electrolyte constituting the electrolyte solution layer has a form in which lithium salts are dissolved in an organic solvent. The liquid electrolyte has a function as a carrier of lithium ion. Examples of the organic solvent that can be used include, for example, carbonates such as ethylene carbonate (EC), propylene carbonate (PC), dimethyl carbonate (DMC), diethyl carbonate (DEC) and ethyl methyl carbonate. In addition, as the lithium salt, compounds which can be added to the active material layer of the electrode such as $Li(CF_3SO_2)_2N$, $Li(C_2F_5SO_2)_2N$, $LiPF_6$, $LiBF_4$, $LiClO_4$, $LiAsF_6$, $LiTaF_6$ and $LiCF_3SO_3$, can be similarly used. The liquid electrolyte may further contain additives in addition to the components that are described above. Specific examples of the compound include, for example, vinylene carbonate, methylvinylene carbonate, dimethylvinylene carbonate, phenylvinylene carbonate, diphenylvinylene carbonate, ethylvinylene carbonate, diethylvinylene carbonate, vinylethylene carbonate, 1,2-divinylethylene carbonate, 1-methyl-1-vinylethylene carbonate, 1-methyl-2-vinylethylene carbonate, 1-ethyl-1-vinylethylene carbonate, 1-ethyl-2-vinylethylene carbonate, vinylvinylene carbonate, allylethylene carbonate, vinyloxymethyl ethylene carbonate, allyloxymethyl ethylene carbonate, acryloxymethyl ethylene carbonate, methacryloxymethyl ethylene carbonate, ethynylethylene carbonate, propargylethylene carbonate, ethynyloxymethyl ethylene carbonate, propargyloxyethylene carbonate, methylene ethylene carbonate, 1,1-dimethyl-2-methylene ethylene carbonate and the like. Among them, vinylene carbonate, methylvinylene carbonate and vinylethylene carbonate are preferable, and vinylene carbonate and vinylethylene carbonate are more preferable. These cyclic carbonate esters may be used either singly or in combination of two or more types.

These electrolytes may be used either singly or in combination of two or more types.

The electrolyte solution layer is formed between the separator and the electrode active material layer by stacking the separator and the electrodes, and then injecting excessive electrolyte solution, as described in the following production method.

A method for controlling the thickness of the electrolyte solution layer is not particularly limited, but one preferable embodiment is a method of controlling group pressure applied to a battery element. Thus, one preferable embodiment of the invention is a non-aqueous electrolyte secondary battery in which group pressure applied to the power generating element is 0.07 to 0.7 $kgf/cm^2$ (6.86 to 68.6 kPa). More preferably, the group pressure applied to the power generating element is 0.08 to 0.7 $kgf/cm^2$ (7.84 to 49.0 kPa). Herein, the group pressure indicates external force applied to the power generating element, and the group pressure can be easily measured using a film type pressure distribution measurement system. In the present specification, a value measured using a film type pressure distribution measurement system manufactured by Tekscan, Inc. is adopted as the group pressure.

Control of the group pressure is not particularly limited, but the group pressure can be controlled by applying external force to the power generating element directly physically or indirectly, and controlling the external force. As a method for applying such external force, a pressure member that applies pressure to an outer casing is preferably used. Specifically, one preferable embodiment of the invention is a non-aqueous electrolyte secondary battery which has a structure in which the power generating element is sealed with an outer casing, and further has a pressure member that applies pressure to the outer casing such that group pressure applied to the power generating element is 0.07 to 0.7 kgf/cm$^2$.

Figure 2A:
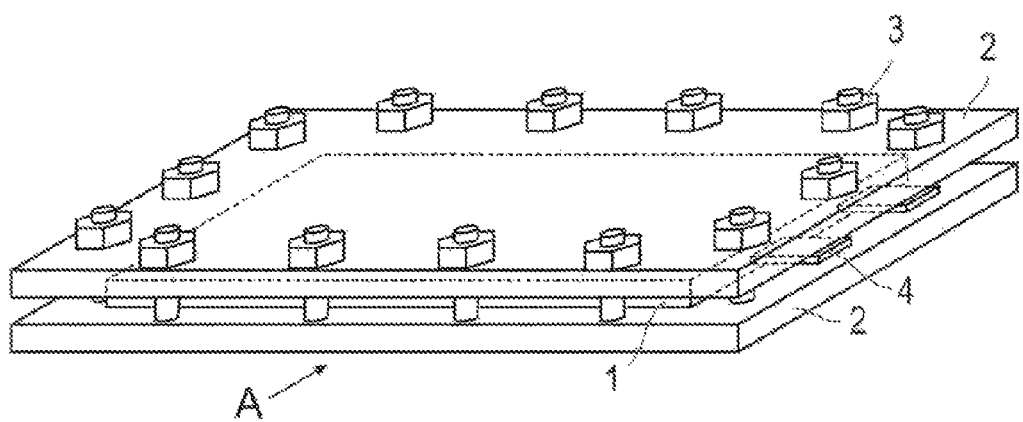
FIG. 2A is a schematic view of a non-aqueous electrolyte secondary battery which is one suitable embodiment of the invention.
Figure 2B:
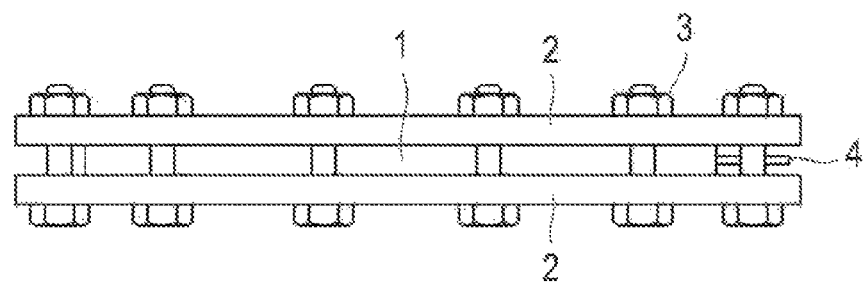
FIG. 2B is a figure viewing from the arrow direction of the direction A in FIG. 2A.

FIG. 2A is a schematic view of a non-aqueous electrolyte secondary battery which is another preferable embodiment of the invention, and FIG. 2B is a figure viewing from the arrow direction of the direction A in FIG. 2A. An outer casing 1 having a sealed power generating element has a flat and rectangular shape, and from the sides thereof, an electrode tab 4 is drawn to extract electric power. The power generating element is covered by the battery outer casing, with its periphery fused by heat. The power generating element is sealed in a state in which the electrode tab 4 is led to the outside. Herein, the power generating element corresponds to the power generating element 21 of the lithium ion secondary battery 10 illustrated in FIG. 1 as described above. In FIG. 2, 2 represents a SUS plate that is a pressure member, and 3 represents a fixing tool that is a fixing member, and 4 represents an electrode tab (negative electrode tab or positive electrode tab). The pressure member is disposed for the purpose of controlling the group pressure applied to the power generating element to be 0.07 to 0.7 kgf/cm$^2$. Examples of the pressure member include a rubber material such as a urethane rubber sheet, a metal plate of aluminum or SUS, and the like. In addition, the non-aqueous electrolyte secondary battery preferably further has a fixing member for fixing the pressure member from the viewpoint that the pressure member can continually apply constant pressure to the power generating element. In addition, the group pressure applied to the power generating element can be easily controlled by regulating fixation of the fixing tool onto the pressure member.

Meanwhile, drawing of the tab illustrated in FIG. 2 is not particularly limited, either. The positive electrode tab and the negative electrode tab may be drawn from both sides, or each of the positive electrode tab and the negative electrode tab may be divided into plural tabs and drawn from each side, and thus it is not limited to the embodiment illustrated in FIG. 2.

Figure 3:
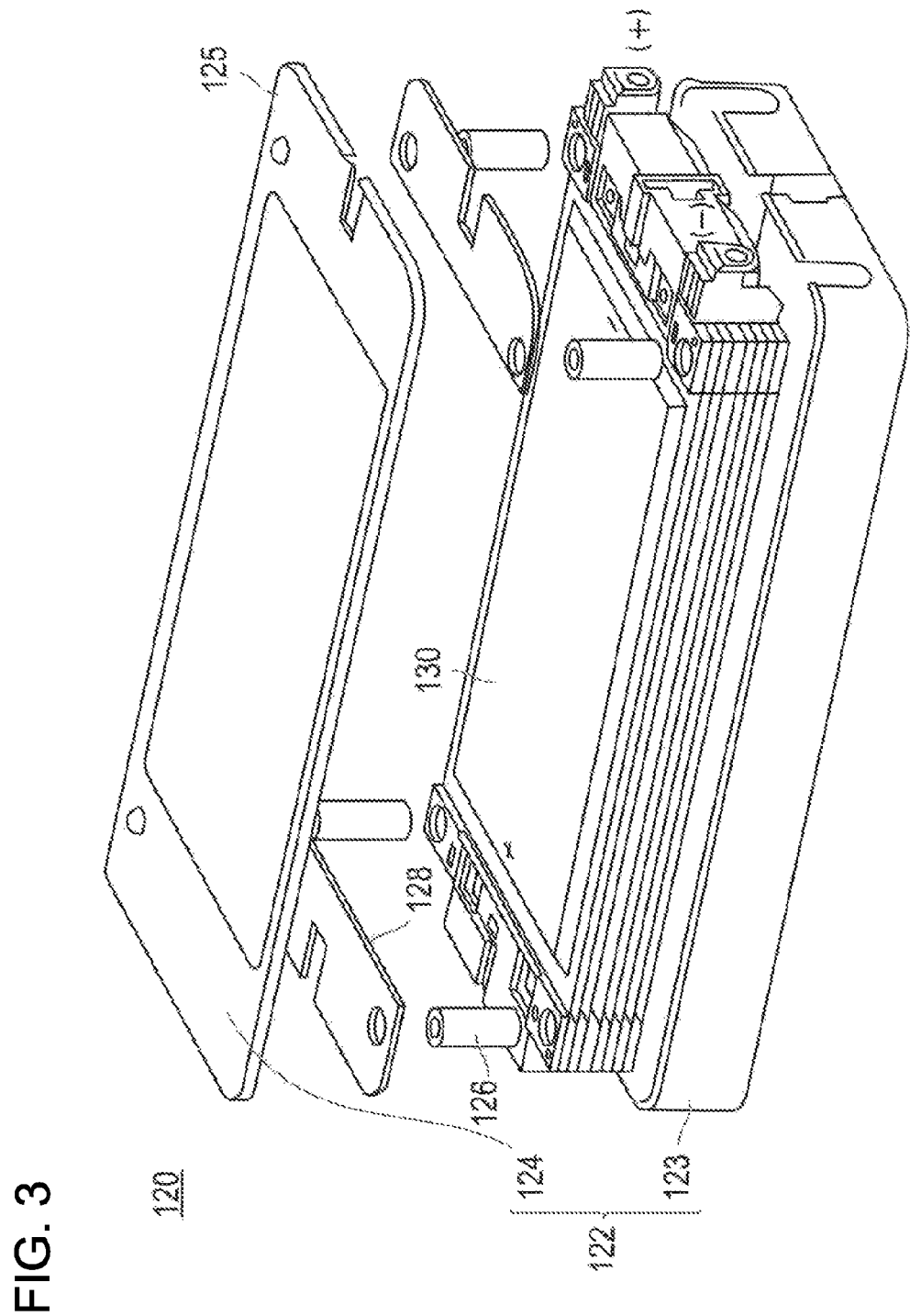
FIG. 3 is a perspective view illustrating a battery module comprising a non-aqueous electrolyte secondary battery which is another suitable embodiment of the invention.

FIG. 3 is a perspective view illustrating a battery module comprising a non-aqueous electrolyte secondary battery which is another preferable embodiment of the invention. The battery module 120 has a single battery 130 in which plural power generating elements sealed in the outer casing are stacked, and a casing 122 consisting of a lower casing 123 forming a box shape and an upper casing 124 forming a lid shape. The margin of the upper casing 124 is wound to the margin of the peripheral wall of the lower casing 123 by caulking processing, and has a protruding portion 125 that projects in the stacking direction. In the embodiment of FIG. 3, the pressure member is the casing 122, and the casing 122 also serves as a fixing member. In the battery module described in FIG. 3, the dimension of the thickness of the battery storage casing is determined, and thus the group pressure applied to the power generating element after storage of the stack is dependent on the thickness of the storage casing. Thus, control of the group pressure applied to the power generating element can be controlled by adjusting the thickness of the battery storage casing considering the thickness of the battery stack. In this embodiment, the non-aqueous electrolyte secondary battery consists of a power generating element (single battery) sealed in the outer casing and a casing that is a pressure member.

The lower casing 123 and the upper casing 124 are formed of a relatively thin wall steel plate or aluminum plate. A metal material such as steel and aluminum has good rigidity, and ensures required rigidity and promotes downsizing and lightening and noise reduction, and has good thermal conductivity and thus improves cooling performance and temperature controllability, which makes it possible to promote fuel consumption reduction and long duration.

In the inside of the casing 122, sleeves 126 and a single battery 130 are accommodated. The sleeves 126 are disposed on 4 corners of the casing 122, and function as a reinforcement member of the casing 122, and are used to receive fastening force for fastening the battery stack. 128 represents a cushioning material provided between the single battery 130 and the upper casing 124.

In addition, the non-aqueous electrolyte secondary battery may be in a form in which a battery (single battery), where the power generating element is sealed with a battery outer casing such as a metal can and a laminate film, is stored in a battery storage casing which is a pressure member and a fixing member.

[Negative Electrode Active Material Layer]

In the invention, the density of the negative electrode active material layer is 1.4 to 1.6 g/cm$^3$. If the density of the negative electrode active material layer exceeds 1.6 g/cm$^3$, the density of the active material layer is high, and thus generated gas is not outgassed from the inside of the electrode, and the long-term cycle property decreases. In addition, if the density of the negative electrode active material layer is less than 1.4 g/cm$^3$, communication property of the active material decreases, and the electron conductivity decreases, and thus the battery performance decreases. The density of the negative electrode active material layer is preferably 1.4 to 1.55 g/cm$^3$ from the viewpoint that the effect of the invention is further exhibited.

The density of the negative electrode active material layer can be controlled to the range described above by suitably adjusting the press pressure in production of the electrode. Meanwhile, the density of the negative electrode active material layer represents mass of the active material layer per unit volume. Specifically, the density of the negative electrode active material layer can be obtained by extracting the negative electrode active material layer from the battery, removing a solvent and the like present in the electrolyte solution and the like, and then obtaining the electrode volume from the long side, the short side and the height, measuring the weight of the active material layer, and then dividing the weight by the volume.

The negative electrode active material layer contains a negative electrode active material. Examples of the negative electrode active material include a carbon material such as graphite, soft carbon, and hard carbon, a lithium-transition metal composite oxide (for example, $Li_4Ti_5O_{12}$), a metal material, and a lithium alloy-based negative electrode material. If necessary, two or more kinds of a negative electrode active material may be used in combination. Preferably, from the viewpoint of capacity and output characteristics, a carbon material or a lithium-transition metal composite oxide is used as a negative electrode active material. Meanwhile, it is needless to say that a negative electrode active material other than those described above can be also used.

The average particle size of each active material contained in the negative electrode active material layer is, although not particularly limited, preferably 1 to 100 μm, and more preferably 1 to 30 μm from the viewpoint of having high output.

The negative electrode active material layer includes at least an aqueous binder. The aqueous binder has an advantage of lowering a burden on environment and greatly suppressing an investment on facilities of a production line, since water as a raw material is conveniently available and only water vapor is generated during drying.

The aqueous binder indicates a binder with which water is used as a solvent or a dispersion medium, and specific examples thereof include a thermoplastic resin, a polymer with rubber elasticity, a water soluble polymer, and a mixture thereof. Herein, the binder with which water is used as a dispersion medium includes all expressed as latex or an emulsion, and it indicates a polymer emulsified in water or suspended in water. Examples thereof include a polymer latex obtained by emulsion polymerization in a self-emulsifying system.

Specific examples of the aqueous binder include a styrene polymer (styrene-butadiene rubber, styrene-vinyl acetic acid copolymer, styrene-acryl copolymer or the like), acrylonitrile-butadiene rubber, methacrylic acid methyl-butadiene rubber, (meth)acrylic polymer (polyethylacrylate, polyethylmethacrylate, polypropylacrylate, polymethylmethacrylate (methacrylic acid methyl rubber), polypropylmethacrylate, polyisopropylacrylate, polyisopropylmethacrylate, polybutylacrylate, polybutylmethacrylate, polyhexylacrylate, polyhexylmethacrylate, polyethylhexylacrylate, polyethylhexylmethacrylate, polylaurylacrylate, polylaurylmethacrylate, or the like), polytetrafluoroethylene, polyethylene, polypropylene, ethylene-propylene copolymer, polybutadiene, butyl rubber, fluororubber, polyethylene oxide, polyepichlorohydrin, polyphosphagen, polyacrylonitrile, polystyrene, ethylene-propylene-diene copolymer, polyvinylpyridine, chlorosulfonated polyethylene, a polyester resin, a phenol resin, an epoxy resin; polyvinyl alcohol (average polymerization degree is preferably 200 to 4,000, and more preferably 1,000 to 3,000, and saponification degree is preferably 80% by mol or more, and more preferably 90% by mol or more) and a modified product thereof (1 to 80% by mol saponified product in a vinyl acetate unit of a copolymer with ethylene/vinyl acetate=2/98 to 30/70 (molar ratio), 1 to 50% by mol partially acetalized product of polyvinyl alcohol, or the like), starch, and a modified product (oxidized starch, phosphoric acid esterified starch, cationized starch, or the like), cellulose derivatives (carboxymethyl cellulose, methyl cellulose, hydroxypropyl cellulose, hydroxyethyl cellulose, and a salt thereof), polyvinylpyrrolidone, polyacrylic acid (salt), polyethylene gylcol, copolymer of (meth)acrylamide and/or (meth)acrylic acid salt [(meth)acrylamide polymer, (meth)acrylamide-(meth)acrylic acid salt copolymer, alkyl (meth)acrylic acid (carbon atom number of 1 to 4) ester-(meth)acrylic acid salt copolymer, or the like], styrene-maleic acid salt copolymer, mannich modified product of polyacrylamide, formalin condensation type resin (urea-formalin resin, melamin-formalin resin or the like), polyamidepolyamine or dialkylamine-epichlorohydrin copolymer, polyethyleneimine, casein, soybean protein, synthetic protein, and a water soluble polymer such as mannan galactan derivatives. The aqueous binder can be used either singly or in combination of two or more types.

From the viewpoint of a binding property, the aqueous binder preferably contains at least one rubber-based binder which is selected from the group consisting of styrene-butadiene rubber, acrylonitrile-butadiene rubber, methacrylic acid methyl-butadiene rubber, and methacrylic acid methyl rubber. Further, the aqueous binder preferably contains styrene-butadiene rubber from the viewpoint of having a good binding property.

When styrene-butadiene rubber is used as an aqueous binder, the aforementioned water soluble polymer is preferably used in combination from the viewpoint of improving the coating property. Examples of the water soluble polymer which is preferably used in combination with styrene-butadiene rubber include polyvinyl alcohol and a modified product thereof, starch and a modified product thereof, cellulose derivatives (carboxymethyl cellulose, methyl cellulose, hydroxyethyl cellulose, and a salt thereof), polyvinylpyrrolidone, polyacrylic acid (salt), and polyethylene glycol. Among them, styrene-butadiene rubber and carboxymethyl cellulose are preferably combined as a binder. The mass content ratio between the styrene-butadiene rubber and the water soluble polymer is not particularly limited, but styrene-butadiene rubber:water soluble polymer is preferably 1:0.3 to 0.7.

In the binder used for the negative electrode active material layer, content of the aqueous binder is preferably 80 to 100% by mass, more preferably 90 to 100% by mass, and even more preferably 100% by mass. As a binder other than an aqueous binder, a binder used in the following positive electrode active material layer can be mentioned.

The amount of the binder contained in the negative electrode active material layer is not particularly limited if it is an amount that allows binding of the active material, but is preferably 0.5 to 15% by mass, more preferably 1 to 10% by mass, and further preferably 2 to 4% by mass with respect to the active material layer. The aqueous binder has high binding force, and thus can form the active material layer with addition of a small amount in comparison to the organic solvent-based binder. From this, the content of the aqueous binder in the active material layer is preferably 0.5 to 15% by mass, more preferably 1 to 10% by mass, and further preferably 2 to 4% by mass with respect to the active material layer.

If necessary, the negative electrode active material layer further contains other additives such as a conductive aid, an electrolyte (for example, polymer matrix, ion conductive polymer, and electrolyte solution), and lithium salt for enhancing ion conductivity.

The conductive aid means an additive which is blended in order to enhance the conductivity of the positive electrode active material layer or negative electrode active material layer. As the conductive aid, for example, there can be mentioned carbon black including acetylene black; graphite; and carbon materials such as carbon fiber. When the active material layer contains a conductive aid, an electron network is formed effectively in the inside of the active material layer, and it can contribute to improvement of the output characteristics of a battery.

Examples of the electrolyte salt (lithium salt) include $Li(C_2F_5SO_2)_2N$, $LiPF_6$, $LiBF_4$, $LiClO_4$, $LiAsF_6$, and $LiCF_3SO_3$.

Examples of the ion conductive polymer include polyethylene oxide (PEO)-based and polypropylene oxide (PPO)-based polymer.

A blending ratio of the components that are contained in the negative electrode active material layer and positive electrode active material layer described below is not particularly limited. The blending ratio can be adjusted by suitably referring the already-known knowledge about a lithium ion secondary battery. The thickness of each active material layer is not particularly limited either, and reference can be made to the already-known knowledge about a battery. For example, the thickness of each active material layer is about 2 to 100 μm.

[Positive Electrode Active Material Layer]

The positive electrode active material layer contains an active material, and if necessary, it further contains other additives such as a conductive aid, a binder, an electrolyte (for example, polymer matrix, ion conductive polymer, and electrolyte liquid), and lithium salt for enhancing ion conductivity.

The positive electrode active material layer contains a positive electrode active material. Examples of the positive electrode active material include a lithium-transition metal composite oxide such as $LiMn_2O_4$, $LiCoO_2$, $LiNiO_2$, $Li(Ni—Mn—Co)O_2$, or a compound in which part of the transition metals is replaced with other element, a lithium-transition metal phosphate compound, and a lithium-transition metal sulfate compound. Depending on the case, two or more kinds of a positive electrode active material can be used in combination. As a preferred example, a lithium-transition metal composite oxide is used as a positive electrode active material from the viewpoint of capacity and output characteristics. As a more preferred example, $Li(Ni—Mn—Co)O_2$ and a compound in which part of the transition metals is replaced with other element (hereinbelow, also simply referred to as the "NMC composite oxide") are used. The NMC composite oxide has a layered crystal structure in which a lithium atom layer and a transition metal (Mn, Ni, and Co are arranged with regularity) atom layer are alternately stacked via an oxygen atom layer, one Li atom is included per atom of transition metal M and extractable Li amount is twice the amount of spinel lithium manganese oxide, that is, as the supply power is two times higher, it can have high capacity.

As described above, the NMC composite oxide includes a composite oxide in which part of transition metal elements are replaced with other metal element. In that case, examples of other element include Ti, Zr, Nb, W, P, Al, Mg, V, Ca, Sr, Cr, Fe, B, Ga, In, Si, Mo, Y, Sn, V, Cu, Ag, and Zn. Preferably, it is Ti, Zr, Nb, W, P, Al, Mg, V, Ca, Sr, or Cr. More preferably, it is Ti, Zr, P, Al, Mg, or Cr. From the viewpoint of improving the cycle characteristics, it is even more preferably Ti, Zr, Al, Mg, or Cr.

By having high theoretical discharge capacity, the NMC composite oxide preferably has a composition represented by General Formula (1): $Li_aNi_bMn_cCo_dM_xO_2$ (with the proviso that, in the formula, a, b, c, d, and x satisfy $0.9 \leq a \leq 1.2$, $0 < b < 1$, $0 < c \leq 0.5$, $0 < d \leq 0.5$, $0 \leq x \leq 0.3$, and $b+c+d=1$. M represents at least one element selected from Ti, Zr, Nb, W, P, Al, Mg, V, Ca, Sr, and Cr). Herein, a represents the atomic ratio of Li, b represents the atomic ratio of Ni, c represents the atomic ratio of Mn, d represents the atomic ratio of Co, and x represents the atomic ratio of M. From the viewpoint of the cycle characteristics, it is preferable that $0.4 \leq b \leq 0.6$ in General Formula (1). Meanwhile, composition of each element can be measured by induction coupled plasma (ICP) spectroscopy.

In general, from the viewpoint of improving purity and improving electron conductivity of a material, nickel (Ni), cobalt (Co) and manganese (Mn) are known to contribute to capacity and output characteristics. Ti or the like replaces part of transition metal in a crystal lattice. From the viewpoint of the cycle characteristics, it is preferable that part of transition element are replaced by other metal element, and it is preferable that $0 < x \leq 0.3$ in General Formula (1), in particular. By dissolving at least one selected from the group consisting of Ti, Zr, Nb, W, P, Al, Mg, V, Ca, Sr and Cr, the crystal structure is stabilized so that a decrease in capacity of a battery is prevented even after repeated charge and discharge, and thus, it is believed that excellent cycle characteristics can be achieved.

As a more preferred embodiment, b, c, and d in General Formula (1) satisfy $0.44 \leq b \leq 0.51$, $0.27 \leq c \leq 0.31$, and $0.19 \leq d \leq 0.26$ from the viewpoint of improving balance between capacity and life-time property. Meanwhile, it is needless to say that a positive electrode active material other than those described above can be also used.

The average particle size of each active material which is contained in the positive electrode active material layer is, although not particularly limited, preferably 1 to 100 and more preferably 1 to 20 μm from the viewpoint of having high output.

A binder used for the positive electrode active material layer is not particularly limited and the following materials can be mentioned; thermoplastic polymers such as polyethylene, polypropylene, polyethylene terephthalate (PET), polyether nitrile, polyacrylonitrile, polyimide, polyamide, cellulose, carboxymethyl cellulose (CMC) and a salt thereof, an ethylene-vinyl acetate copolymer, polyvinyl chloride, styrene-butadiene rubber (SBR), isoprene rubber, butadiene rubber, ethylene-propylene rubber, an ethylene-propylene-diene copolymer, a styrene-butadiene-styrene block copolymer and a hydrogenated product thereof, and a styrene-isoprene-styrene block copolymer and a hydrogenated product thereof, fluorine resins such as polyvinylidene fluoride (PVdF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoroethylene copolymer (ETFE), polychlorotrifluoroethylene (PCTFE), an ethylene-chlorotrifluoroethylene copolymer (ECTFE), and polyvinyl fluoride (PVF), vinylidene fluoride-based fluorine rubber such as vinylidene fluoride-hexafluoropropylene-based fluorine rubber (VDF-HFP-based fluorine rubber), vinylidene fluoride-hexafluoropropylene-tetrafluoroethylene-based fluorine rubber (VDF-HFP-TEF-based fluorine rubber), vinylidene fluoride-pentafluoropropylene-based fluorine rubber (VDF-PFP-based fluorine rubber), vinylidene fluoride-pentafluoropropylene-tetrafluoroethylene-based fluorine rubber (VDF-PFT-TFE-based fluorine rubber), vinylidene fluoride-perfluoromethyl vinyl ether-tetrafluoroethylene-based fluorine rubber (VDF-PFMVE-TFE-based fluorine rubber), and vinylidene fluoride-chlorotrifluoroethylene fluorine-based fluorine rubber (VDF-CTFE-based fluorine rubber), an epoxy resin, and the like. These binders may be each used singly, or two or more thereof may be used in combination.

The amount of the binder contained in the positive electrode active material layer is not particularly limited if it is an amount that allows binding of the active material, but is preferably 0.5 to 15% by mass, and more preferably 1 to 10% by mass with respect to the active material layer.

With regard to other additives other than the binder, those described for the above negative electrode active material layer can be also used.

[Separator]

A separator has an activity of maintaining an electrolyte to ensure lithium ion conductivity between a positive electrode and a negative electrode and also a function of a partition wall between a positive electrode and negative electrode.

The separator is not particularly limited, and those already-known can be suitably employed. For example, examples of the separator include a porous sheet separator or a non-woven separator composed of a polymer or a fiber which absorbs and maintains the electrolyte.

As a porous sheet separator composed of a polymer or a fiber, a microporous (microporous membrane) separator can be used, for example. Specific examples of the porous sheet composed of a polymer or a fiber include a microporous (microporous membrane) separator which is composed of polyolefin such as polyethylene (PE) and polypropylene (PP); a laminate in which plural of them are laminated (for example, a laminate with three-layer structure of PP/PE/PP), and a hydrocarbon based resin such as polyimide, aramid, or polyfluorovinylydene-hexafluoropropylene (PVdF-HFP), or glass fiber.

The thickness of the microporous (microporous membrane) separator cannot be uniformly defined as it varies depending on use of application. For example, for an application in a secondary battery for operating a motor of an electric vehicle (EV), a hybrid electric vehicle (HEV), and a fuel cell vehicle (FCV), it is preferably 4 to 60 μm as a monolayer or a multilayer. Fine pore diameter of the microporous (microporous membrane) separator is preferably 1 μm or less at most (in general, the pore diameter is about several tens of nanometer).

As a non-woven separator, conventionally known ones such as cotton, rayon, acetate, nylon, polyester; polyolefin such as PP and PE; polyimide and aramid are used either singly or as a mixture. Furthermore, the volume density of a non-woven fabric is not particularly limited as long as sufficient battery characteristics are obtained with an impregnated polymer gel electrolyte. Furthermore, the thickness of a separator composed of non-woven fabric can be the same as the thickness of an electrolyte layer, and it is preferably 5 to 200 μm and particularly preferably 10 to 100 μm.

Herein, the separator can be a separator having a heat resistant insulating layer laminated on a porous resin substrate. The heat resistant insulating layer is a ceramic layer containing inorganic particles and a binder. By having a heat resistant insulating layer, internal stress in a separator which increases under temperature increase is alleviated so that the effect of inhibiting thermal shrinkage can be obtained. Furthermore, by having a heat resistant insulating layer, mechanical strength of a separator having a heat resistant insulating layer is improved so that the separator hardly has a film breaking. Furthermore, because of the effect of inhibiting thermal shrinkage and a high level of mechanical strength, the separator is hardly curled during the process of fabricating an electric device.

Furthermore, as described above, the separator also contains an electrolyte. The electrolyte is not particularly limited as long as it can exhibit those functions, and a liquid electrolyte or a gel polymer electrolyte is used. Examples of the liquid electrolyte include those used in the electrolyte solution layer described above.

The gel polymer electrolyte has a constitution that the aforementioned liquid electrolyte is injected to a matrix polymer (host polymer) consisting of an ion conductive polymer. Using a gel polymer electrolyte as an electrolyte is excellent in that the fluidity of an electrolyte disappears and ion conductivity between each layer is blocked. Examples of an ion conductive polymer which is used as a matrix polymer (host polymer) include polyethylene oxide (PEO), polypropylene oxide (PPO), and a copolymer thereof. An electrolyte salt such as lithium salt can be dissolved well in those polyalkylene oxide polymers.

According to forming of a cross-linked structure, the matrix polymer of a gel electrolyte can exhibit excellent mechanical strength. For forming a cross-linked structure, it is sufficient to perform a polymerization treatment of a polymerizable polymer for forming a polymer electrolyte (for example, PEO and PPO), such as thermal polymerization, UV polymerization, radiation polymerization, and electron beam polymerization, by using a suitable polymerization initiator.

[Battery Outer Casing]

As for the battery outer casing 29, an envelope-shaped casing which can cover a power generating element, and in which a laminate film including aluminum is contained, can be used in addition to a known metal can casing. As for the laminate film, a laminate film with a three-layer structure formed by laminating PP, aluminum and nylon in order can be used, but not limited thereto. From the viewpoint of having high output and excellent cooling performance, and of being suitably usable for a battery for a large instrument such as EV or HEV, a laminate film is preferable. Furthermore, as the group pressure applied from outside to a power generating element can be easily controlled and thus the thickness of an electrolyte solution layer can be easily controlled to a desired value, a laminate film containing aluminum is more preferred for an outer casing.

The internal volume of the outer casing is preferably larger than the volume of the power generating element. Herein, the internal volume of the outer casing indicates the volume in the outer casing before performing vacuum drawing after sealing with the outer casing. In addition, the volume of the power generating element is the volume of the portion spatially occupied by the power generating element, and contains cavities in the power generating element. With the internal volume of the outer casing larger than the volume of the power generating element, volume is present that can store gas when the gas is generated. Thus, discharge of gas from the system is smoothly performed, and influence of generated gas on the battery behavior is small, and the battery properties improve. In addition, surplus area that can store gas when the gas is generated, is present in the outer casing, and thus the volume of the power generating element can be constantly maintained, whereby to fix the distance between the electrodes, and allow maintenance of uniform reaction. The internal volume of the outer casing is preferably large to some extent so as to store gas. Specifically, the internal volume of the outer casing is preferably larger than the volume of the power generating element by from 0.03 to 0.12 volume fraction of the volume of the power generating element excluding the pore portion.

A large-size battery is required recently for use in an automobile and the like. In addition, the effect of the invention, that is, effective discharge of generated gas to the exterior, can be more effectively exhibited in a large-area battery having a large amount of gas generation. Thus, in the invention, a battery structure in which a power generating element is covered with an outer casing preferably has a large size in a sense of further exhibiting the effect of the invention. Specifically, the negative electrode active material layer preferably has a rectangular shape, and the length of the short side of the rectangular shape is 100 mm or more.

Such a large-size battery can be used for use in cars. The upper limit of the length of the short side of the rectangular shape is not particularly limited, but usually 250 mm or less.

It is also possible to determine the large size of a battery based on a relationship between battery area and battery capacity, as the viewpoint of a large-size battery, which is different from a physical size of an electrode. For example, in the case of a flat and stack type laminate battery, the ratio value of a battery area to rated capacity (the maximum value of projected area of a battery including an outer casing of a battery) is 5 $cm^2$/Ah or more, and for a battery with rated capacity of 3 Ah or more, the battery area per unit capacity is large so that the gas generation amount is still large. Thus, a problem of a decrease in battery performance (particularly, life-time property after long-term cycle) in a battery in which an aqueous binder such as SBR is used in formation of the negative electrode active material layer, may occur more easily. Thus, the non-aqueous electrolyte secondary battery according to this embodiment is preferably a large-size battery as described above from the viewpoint of having a larger merit obtained from exhibition of the working effects of the present invention. Furthermore, the aspect ratio of a rectangular electrode is preferably 1 to 3, and more preferably 1 to 2. Meanwhile, the aspect ratio of an electrode is defined by longitudinal/transversal ratio of a positive electrode active material layer with rectangular shape. By having the aspect ratio in this range, advantages of allowing for gas discharge uniformly in the plane direction, and further suppressing uneven film generation, in the invention in which use of an aqueous binder is essential.

[Current Collector]

The material for forming a current collector is not particularly limited, but metal is preferably used. Specific examples of the metal include aluminum, nickel, iron, stainless, titan, copper, and other alloys. In addition to them, a clad material of a nickel and aluminum, a clad material of copper and aluminum, or a plating material of a combination of those metals can be preferably used. It can be also a foil obtained by coating aluminum on a metal surface. Among them, from the viewpoint of electron conductivity or potential for operating a battery, aluminum, stainless, and copper are preferable.

The size of the current collector is determined based on use of a battery. When it is used for a large-size battery which requires high energy density, for example, a current collector with large area is used. The thickness of the current collector is not particularly limited, either. The thickness of the current collector is generally about 1 to 100 μm.

[Positive Electrode Current Collecting Plate and Negative Electrode Current Collecting Plate]

The material for forming the current collecting plate (25, 27) is not particularly limited, and a known highly conductive material which has been conventionally used for a current collecting plate for a lithium ion secondary battery can be used. Preferred examples of the material for forming a current collecting plate include metal material such as aluminum, copper, titanium, nickel, stainless steel (SUS) and an alloy thereof. From the viewpoint of light weightiness, resistance to corrosion, and high conductivity, aluminum and copper are preferable. Aluminum is particularly preferable. Meanwhile, the same material or a different material can be used for the positive electrode current collecting plate 25 and the negative electrode current collecting plate 27.

[Positive Electrode Lead and Negative Electrode Lead]

Further, although it is not illustrated, the current collector 11 and the current collecting plate (25, 27) can be electrically connected to each other via a positive electrode lead or a negative electrode lead. The same material used for a lithium ion secondary battery of a related art can be also used as a material for forming a positive electrode lead and a negative electrode lead. Meanwhile, a portion led out from a casing is preferably coated with a heat resistant and insulating thermally shrunken tube or the like so that it has no influence on a product (for example, an automobile component, in particular, an electronic device or the like) by electric leak after contact with neighboring instruments or wirings.

[Production Method]

A method for producing the non-aqueous electrolyte secondary battery is not particularly limited, and can be produced with reference to already-known findings in the field of battery production.

One preferable embodiment of a method for producing the non-aqueous electrolyte secondary battery of the invention is as described below.

The method is a method for producing a non-aqueous electrolyte secondary battery, which comprises a process of forming a laminate in which a separator, a negative electrode and a positive electrode are stacked, a process of enclosing the laminate into an outer casing, a process of adding an electrolyte solution into the outer casing, and a process of disposing a pressure member onto the outer casing, and applying pressure to the outer casing such that group pressure applied to the power generating element in the outer casing is 0.07 to 0.7 kgf/$cm^2$.

Hereinafter, each process will be briefly described.

(1) Process of Forming Laminate in which Separator, Negative Electrode and Positive Electrode are Stacked First, a slurry containing an active material is coated onto a current collector, and dried to manufacture an electrode. At this time, an aqueous slurry is preferably used as an aqueous binder is used in the negative electrode active material layer. An aqueous solvent may be used when the aqueous slurry is manufactured. The aqueous solvent is preferable from the point of productivity since a large-scale production facility is not necessary, and also preferable from the point of environmental conservation in comparison to the case of using an organic solvent. The aqueous solvent indicates water and a mixed solvent of water and an organic solvent. Examples of the aqueous solvent include specifically, water and mixed solvents of water with methanol, ethanol or ethyl acetate, and water is more preferable. When a mixed solvent of water with a small amount of an organic solvent is used as the aqueous solvent, the content of water in the mixed solvent is preferably 80 to 99.9% by mass, and more preferably 90 to 99.5% by mass with respect to 100% by mass of the total mixed solvent.

Next, the electrode and the separator manufactured as described above are stacked in a desired form and a stack number, to manufacture a laminate which is a power generating element.

(2) Process of Sealing Laminate with Outer Casing

Subsequently, a tab connected with a lead is joined to the outermost layer of the laminate obtained by the procedures described above, and a battery element is sealed such that the lead is exposed to the outside. At this time, an open end for injecting an electrolyte solution may be also provided.

(3) Process of Adding Electrolyte Solution to Outer Casing

Examples of the method for injecting an electrolyte solution into the outer casing include a method of injecting an electrolyte solution into the cavity between electrodes by decompression injection method, a method of adding an electrolyte solution together with the laminate into the outer casing described above, and sealing the outer casing.

(4) Process of disposing pressure member onto outer casing and applying pressure to outer casing such that group pressure applied to power generating element in outer casing is 0.07 to 0.7 kgf/cm$^2$. A method for applying group pressure to the outer casing by a pressure member is not particularly limited, and examples of the method include, for example, a method of fixing a pressure member with a fixing tool and applying group pressure to a power generating element as illustrated in FIG. 2 described above, and the like.

[Assembled Battery]

A single battery or electric module may be made as an assembled battery by being connected in a plural number. Specifically, at least two of them are used in series, in parallel, or in series and parallel for the assembled battery. According to arrangement in series or parallel, it becomes possible to freely control the capacity and voltage.

It is also possible to form a detachable small-size assembled battery by connecting plural batteries in series or in parallel. Furthermore, by connecting again plural detachable small-size assembled batteries in series or parallel, an assembled battery having high capacity and high output, which is suitable for a power source for operating a vehicle requiring high volume energy density and high volume output density or an auxiliary power source, can be formed. The number of the connected batteries for fabricating an assembled battery or the number of the stacks of a small-size assembled battery for fabricating an assembled battery with high capacity can be determined depending on the capacity or output of a battery of a vehicle (electric vehicle) for which the battery is loaded.

[Vehicle]

The above described non-aqueous electrolyte secondary battery can maintain discharge capacity even when it is used for a long period of time, and thus has good cycle characteristics. For use in a vehicle such as an electric vehicle, a hybrid electric vehicle, a fuel cell electric vehicle, or a hybrid fuel cell electric vehicle, long service life is required as well as high capacity and large size compared to use for an electric and mobile electronic device. The above described non-aqueous electrolyte secondary battery can be preferably used as a power source for a vehicle, for example, as a power source for operating a vehicle or as an auxiliary power source.

Specifically, an assembled battery can be mounted on a vehicle. According to the present invention, a battery with excellent long term reliability, output characteristics, and long service life can be formed, and thus, by mounting this battery, a plug-in hybrid electric vehicle with long EV driving distance and an electric vehicle with long driving distance per charge can be achieved. That is because, when the battery or an assembled battery formed by combining plural batteries is used for, for example, a vehicle such as hybrid car, fuel cell electric car, and electric car (including two-wheel vehicle (motor bike) or three-wheel vehicle in addition to all four-wheel vehicles (automobile, truck, commercial vehicle such as bus, compact car, or the like)), a vehicle with long service life and high reliability can be provided. However, the use is not limited to a vehicle, and it can be applied to various power sources of other transportation means, for example, a moving object such as an electric train, and it can be also used as a power source for loading such as an uninterruptable power source device.

EXAMPLES

A description is made below in more detail in view of Examples and Comparative Examples, but the present invention is not limited to the Examples given below.

Example 1

1. Production of Electrolyte Solution

A mixed solvent of ethylene carbonate (EC), ethyl methyl carbonate (EMC) and diethyl carbonate (DEC) (30:30:40 (volume ratio)) was used as the solvent. In addition, 1.0 M LiPF$_6$ was used as the lithium salt. 2% by mass of vinylene carbonate was further added to the total 100% by mass of the solvent and the lithium salt to produce an electrolyte solution. Meanwhile, "1.0 M LiPF$_6$" means 1.0 M concentration of the lithium salt (LiPF$_6$) in a mixture of the mixed solvent and the lithium salt.

2. Production of Positive Electrode

A solid consisting of 85% by mass of LiMn$_2$O$_4$ as a positive electrode active material (average particle diameter: 15 µm), 5% by mass of acetylene black as a conductive aid, and 10% by mass of PVdF as a binder was prepared. To this solid, N-methyl-2-pyrrolidone (NMP), which is a solvent for adjusting the slurry viscosity, was added in a suitable amount, to produce a positive electrode slurry. Next, the positive electrode slurry was coated on both surfaces of an aluminum foil (20 µm) as a current collector, and subjected to drying and pressing, to produce an positive electrode having 20.0 mg/cm$^2$ of the coating amount on a single surface and 172 µm of both surface thickness (including the foil). In addition, the density of the positive electrode active material layer was 2.92 g/cm$^3$.

3. Production of Negative Electrode

A solid consisting of 95% by mass of artificial graphite (average particle diameter: 20 µm) as a negative electrode active material, 2% by mass of acetylene black as a conductive aid and 2% by mass of SBR (manufactured by Zeon Corporation) as a binder and 1% by mass of CMC (manufactured by NIPPON PAPER Chemicals CO., LTD., trade name: SUNROSE) was prepared. To this solid, ion exchanged water, which is a solvent for adjusting the slurry viscosity, was added in a suitable amount, to produce a negative electrode slurry. Next, the negative electrode slurry was coated on both surfaces of a copper foil (15 µm) which is a current collector, and subjected to drying and pressing, to produce a negative electrode having 5.64 mg/cm$^2$ of the coating amount on a single surface and 92 µm of both surface thickness (including the foil). In addition, the density of the negative electrode active material layer was 1.46 g/cm$^3$.

4. Completion Process of Single Battery

The positive electrode manufactured as described above was cut to a rectangular shape of 210×184 mm, and the negative electrode layer was cut to a rectangular shape of 215×188 mm (15 pieces of the positive electrode and 16 pieces of the negative electrode). These positive electrode and negative electrode were alternately laminated with a separator of 219×191 mm (polyolefin microporous membrane, 25 µm thickness, 55% porosity) interposed therebetween.

These positive electrode and negative electrode were welded with a tab, respectively, and sealed together with an electrolyte solution in an amount as described in Table 1 into a casing consisting of an aluminum laminate film to complete a battery. The battery was inserted with a urethane rubber sheet (3 mm thickness) having larger area than the area of the electrode and further an Al plate (5 mm thickness), and was pressed to the group pressure described in Table 1 to complete a single battery. The battery manufactured as described above had rated capacity of 17.7 Ah and the ratio of battery area to the rated capacity was 28.8 cm$^2$/Ah. Meanwhile, the rated capacity of the battery (single battery), was obtained as described below.

An electrolyte solution is injected to a testing battery, and then maintained for about 10 hours, to perform an initial charge. Then, the rated capacity is measured by the following procedures 1 to 5 at the temperature of 25° C. and in the voltage range of 3.0 V to 4.15 V.

Procedure 1: After the voltage reaches 4.15 V at constant current charge of 0.2 C, rest for 5 minutes.

Procedure 2: Following procedure 1, charge for 1.5 hours at constant voltage charge, and rest for 5 minutes.

Procedure 3: After the voltage reaches 3.0 V by constant current discharge of 0.2 C, discharge for 2 hours at constant voltage discharge, and then rest for 10 seconds.

Procedure 4: After the voltage reaches 4.1 V by constant current charge of 0.2 C, charge for 2.5 hours at constant voltage charge, and then rest for 10 seconds.

Procedure 5: After the voltage reaches 3.0 V by constant current discharge of 0.2 C, discharge for 2 hours at constant voltage discharge, and then stop for 10 seconds.

Rated capacity: Discharge capacity in discharge from constant current discharge to constant voltage discharge (CCCV discharge capacity) in procedure 5 is taken as rated capacity.

The total thickness of the positive electrode, the negative electrode, the separator and the electrolyte solution layer (the thickness of the power generating constituent element), and the ratio of total thickness of the positive electrode, the negative electrode and the separator to the total thickness of the positive electrode, the negative electrode, the separator and the electrolyte solution layer (ratio of the thickness of the power generating element members/the thickness of the power generating constituent element) of the obtained single battery were described in Table 1.

Examples 2 to 12 and Comparative Examples 1 to 3

A battery was produced similarly to Example 1 except that the electrolyte solution was injected in the electrolyte solution amount described in Table 1, and the battery was pressed so as to the group pressure of the outer casing described in Table 1.

(Evaluation of the Battery)

1. First Time Charge Process of a Single Battery

The non-aqueous electrolyte secondary battery (single battery) manufactured as described above was evaluated by charge and discharge performance test. In this charge and discharge performance test, the battery was maintained for 24 hours in an incubator maintained at 25° C., and first time charge was carried out. As the first time charge, the battery was subjected to constant current charge (CC) until 4.2 V at the current value of 0.05 CA, and then charged for 25 hours in total with constant voltage (CV). Then, the battery was maintained for 96 hours in an incubator maintained at 40° C. Then, in an incubator maintained at 25° C., discharge was performed until 2.5 V at the current rate of 1 C, and then 10 minutes of the resting time was provided.

2. Evaluation of Battery

The non-aqueous electrolyte secondary battery (single battery) manufactured as described above was evaluated by charge and discharge performance test. In this charge and discharge performance test, the battery was set up to 45° C. of the battery temperature in an incubator maintained at 45° C., and then the performance test was performed. As for the charge, the battery was subjected to constant current charge (CC) until 4.2 V at the current rate of 1 C, and then charged for 2.5 hours in total with constant voltage (CV). Then, 10 minutes of the resting time was provided, and then discharge was performed until 2.5 V at the current rate of 1 C, and then 10 minutes of the resting time was provided. These were regarded as one cycle, and the charge and discharge test was carried out. The ratio of discharge after 300 cycles to first time discharge capacity was used as the capacity retention rate. The results are shown in Table 1.

TABLE 1

| | Amount of electrolyte solution [cm$^3$] | Thickness of power generating constituent element [mm] | Outer casing group pressure [kgf/cm$^2$] | Ratio of thickness of power generating element members/thickness of power generating constituent element [—] | Capacity retention rate after 300 cycles [%] |
|---|---|---|---|---|---|
| Example 1 | 75.0 | 5.11 | 0.08 | 0.94 | 73.4 |
| Example 2 | 77.8 | 5.24 | 0.08 | 0.92 | 73.1 |
| Example 3 | 82.1 | 5.52 | 0.08 | 0.87 | 74.2 |
| Example 4 | 75.0 | 4.89 | 0.15 | 0.98 | 76.3 |
| Example 5 | 77.8 | 4.93 | 0.15 | 0.97 | 75 |
| Example 6 | 82.1 | 5.26 | 0.15 | 0.91 | 74.9 |
| Example 7 | 75.0 | 4.92 | 0.70 | 0.98 | 78.9 |
| Example 8 | 77.8 | 4.95 | 0.70 | 0.97 | 75.1 |
| Example 9 | 82.1 | 5.03 | 0.70 | 0.96 | 78.2 |
| Comparative Example 1 | 75.0 | 5.78 | 0 | 0.83 | 69.3 |
| Comparative Example 2 | 77.8 | 6.00 | 0 | 0.80 | 67.1 |
| Comparative Example 3 | 82.1 | 6.65 | 0 | 0.72 | 65.3 |

* Thickness of power generating constituent element: total thickness of positive electrode, negative electrode, separator and electrolyte solution layer
Thickness of power generating element members: total thickness of positive electrode, negative electrode and separator From the results described above, it was found that the batteries of Examples 1 to 9 have high capacity retention rate after long-term cycle in comparison to the batteries of Comparative Examples 1 to 3.

The invention claimed is:

1. A non-aqueous electrolyte secondary battery comprising a power generating element including
    a positive electrode in which a positive electrode active material layer is formed on a surface of a positive electrode current collector,
    a negative electrode in which a negative electrode active material layer containing an aqueous binder is formed on a surface of a negative electrode current collector, and
    a separator that is disposed between the positive electrode active material layer and the negative electrode active material layer,
    wherein the density of the negative electrode active material layer is 1.4 to 1.6 g/cm$^3$,
    an electrolyte solution layer consisting of liquid electrolytes is disposed directly between the negative electrode active material layer and the separator, and
    a ratio of total thickness of the positive electrode, the negative electrode and the separator to total thickness of the positive electrode, the negative electrode, the separator and the electrolyte solution layer, is 0.85 or more and less than 1.0.

2. The non-aqueous electrolyte secondary battery according to claim 1, wherein the ratio of total thickness of the positive electrode, the negative electrode and the separator to total thickness of the positive electrode, the negative electrode, the separator and the electrolyte solution layer, is 0.95 or more and less than 1.0.

3. The non-aqueous electrolyte secondary battery according to claim 1, wherein the power generating element has a structure of being sealed with an outer casing, and further has a pressure member that applies pressure to the outer casing such that group pressure applied to the power generating element is 0.07 to 0.7 kgf/cm$^2$.

4. The non-aqueous electrolyte secondary battery according to claim 1, wherein the power generating element has a structure of being sealed with an outer casing, and the internal volume of the outer casing is larger than the volume of the power generating element.

5. The non-aqueous electrolyte secondary battery according to claim 4, wherein the outer casing is a laminate film containing aluminum.

6. The non-aqueous electrolyte secondary battery according to claim 1, wherein the negative electrode active material layer has a rectangular shape, and the length of the short side of the rectangular shape is 100 mm or more.

7. The non-aqueous electrolyte secondary battery according to claim 1, wherein a ratio of a battery area, defined as a projected area of the battery including an outer casing of the battery, to rated capacity is 5 cm$^2$/Ah or more, and the rated capacity is 3 Ah or more.

8. The non-aqueous electrolyte secondary battery according to claim 1, wherein the positive electrode active material layer is rectangular, and the aspect ratio of the electrode defined as a longitudinal/transversal ratio of the positive electrode active material layer is 1 to 3.

9. The non-aqueous electrolyte secondary battery according to claim 1, wherein the power generating element has a structure of being sealed with an outer casing, and
  further has a pressure member that applies pressure to the outer casing such that group pressure applied to the power generating element is 0.07 to 0.7 kgf/cm$^2$, and further has a fixing member for fixing and maintaining the pressure member.

10. The non-aqueous electrolyte secondary battery according to claim 1, wherein the aqueous binder includes at least one rubber-based binder selected from the group consisting of styrene-butadiene rubber, acrylonitrile-butadiene rubber, methacrylic acid methyl-butadiene rubber, and methacrylic acid methyl rubber.

11. The non-aqueous electrolyte secondary battery according to claim 10, wherein the aqueous binder includes styrene-butadiene rubber.

12. The non-aqueous electrolyte secondary battery according to claim 1, further comprising another electrolyte solution layer consisting of liquid electrolytes disposed directly between the positive electrode active material layer and the separator.

* * * * *